United States Patent [19]
Bond

[11] 3,771,483
[45] Nov. 13, 1973

[54] APPARATUS AND METHOD FOR THE AUTOMATIC NAVIGATION OF A SAILING VESSEL

[75] Inventor: Donald Spencer Bond, Princeton, N.J.

[73] Assignee: RCA Corporation, New York, N.Y.

[22] Filed: Oct. 29, 1971

[21] Appl. No.: 193,755

Related U.S. Application Data

[62] Division of Ser. No. 886,300, Dec. 18, 1969, Pat. No. 3,691,978.

[52] U.S. Cl. .......... 114/39, 114/144 R, 235/150.27, 318/588
[51] Int. Cl. .......................................... B63h 25/04
[58] Field of Search .................... 114/39, 144 R; 318/580, 581, 588; 235/150.2, 150.27; 343/102, 103, 112 R, 112 D, 112 PT

[56] References Cited
UNITED STATES PATENTS

| | | |
|---|---|---|
| 3,016,533 | 1/1962 | Frank .................... 343/112 R X |
| 3,132,620 | 5/1964 | Court .................................. 114/39 |
| 3,173,395 | 3/1965 | Laurent .............................. 114/39 |
| 3,295,487 | 1/1967 | Smith ............................. 114/39 X |
| 3,505,577 | 4/1970 | Hirokawa ................... 114/144 R X |
| 3,517,285 | 6/1970 | Kundler ............................. 318/588 |
| 3,532,267 | 10/1970 | Tobin ........................ 235/150.2 X |

*Primary Examiner*—Milton Buchler
*Assistant Examiner*—Barry L. Kelmachter
*Attorney*—Edward J. Norton

[57] ABSTRACT

A navigation system for a sailing vessel which automatically sails the vessel from its present location to a destination location. The system responds to the prevailing wind conditions and characteristics of the craft to either sail directly or tack to the desired destination. Upon arrival at the destination location the system navigates the vessel to cause the vessel to keep a station in the immediate vicinity of the destination location.

1 Claim, 4 Drawing Figures

APPARATUS AND METHOD FOR THE AUTOMATIC NAVIGATION OF A SAILING VESSEL

This is a division of application Ser. No. 886,300, filed Dec. 18, 1969, now U.S. Pat. No. 3,691,978.

This invention relates to the automatic navigation of a sailing vessel.

Automatic navigation systems are known in the prior art. Such systems generally fall into two classes, i.e., the remote control type and the autopilot type. In both types the operating procedure is to set or compute a range and bearing from the present location to a destination location and automatically move the craft directly between the two points. Some of these prior art systems also provide compensation for the change in heading or attitude of the craft in response to externally applied forces. Such forces may be the wind, ocean currents or even the change in weight of a rocket as fuel is consumed.

Automatic navigation of sailing vessels is a complicated problem because the system must not merely compensate for prevailing wind and current conditions, but in addition it must use the wind, either completely or partially, as the motive force for the vessel.

When it is desired to tack a sailing vessel, that is to cause the vessel's head to swing through the wind, the rudder and sail must be adjusted to point the craft across the wind. As the vessel heels before the wind while tacking, a proper balance must be maintained or the craft will capsize. Furthermore, the craft must have a certain velocity in the water as it completes the tack across the wind or it will not be able to make a follow-up tack which will result in an "in irons" or stalled condition before the wind. Another complication in the tacking maneuver is that the vessel will capsize if the rudder is moved too quickly when turning into the wind.

In general, when sailing from one point to another, the rudder must be first positioned to head the craft on the desired bearing. Once the desired bearing is attained, the rudder is aligned with the fore-aft axis of the craft and the sail is positioned to catch the wind in a manner which will provide the greatest force vector in the direction of the desired bearing. Here, again, in bringing the craft about to the desired bearing care must be taken never to head directly into the wind or the craft will be stalled.

In both tacking and running free with the wind coming from the aft direction, the sail must be periodically trimmed and in some instances even furled and unfurled.

As a result of the characteristics and problems inherent in sailing, the prior art does not disclose any practical automatic navigation system for a sailing vessel.

A very useful application for an automatic navigation system for a sailing vessel is in the field of sea buoys. Moored, unattended buoys have long been used at sea as navigation guides to mariners. Some buoys have included sensors for measuring air and water characteristics. Practically all such buoys have been restricted to relatively shallow coastal waters where the problems of anchoring the buoys are not severe and where the buoys are readily accessible for maintenance.

More recently, experimental buoys have been built for mooring in the deep ocean. Such deep-sea anchoring means are extremely expensive in both initial installation cost and maintenance. The buoys themselves must be very rugged to withstand strong wind and waves and the induced mooring stresses. If the buoy is located at a great distance from a shore base, the cost of sending a sea-going buoy tender is excessive.

With one embodiment of the present invention a system of buoys may be set out on the ocean from a shore base and ultimately sailed to desired locations wherein they may be left unattended for the telemetering of meteorological and hydrological observations.

The automatic navigation system herein disclosed automatically sails a vessel having a hull, a sail and a rudder to a given destination. The structure of the vessel determines a close haul angle of plus or minus M with respect to the wind direction (the plus and minus values may differ if the vessel is asymmetrical about its fore-aft axis). Means are provided for determining the present location of the vessel and the range and bearing from the present location to the destination. The direction of the wind is determined and the bearing angle B from the present location to the destination with respect to the wind is determined. Means are provided for positioning the sail and the rudder of the vessel to sail directly to the destination when the absolute value of angle B is greater than the absolute value of angle M. Furthermore, means are provided for positioning the sail and the rudder of the vessel to sail to the destination on two or more tacks when the absolute value of angle B is less than the absolute value of angle M.

The invention herein described may be practiced with a vessel having a sail and a rudder, and is especially useful with a craft having a rigid or semi-rigid sail. Such a craft is disclosed in United States patent application Ser. No. 794,589, now U.S. Pat. No. 3,556,035 assigned to the same assignee as the present application. The craft in the referenced patent application is further characterized by a substantially circular hull structure which, in combination with the sail and rudder configuration allows the vessel to be oriented towards a desired location by setting the sail and rudder in predetermined positions. Utilization of the referenced craft permits a simplification of the structure for practicing the present invention in the preferred embodiment shown herein.

The substantially circular hull shown in the referenced application is not essential for practicing the present invention. A conventional yacht hull may be used with the present invention but, for reasons set forth herein, a conventional yacht hull is less desirable.

Similarly, any wind energized propulsion means, such as an airfoil, a cloth sail, or Flettner rotor may be substituted for the sail in the referenced application. However, when a sail system of more complicated handling characteristics is used, several additional servomechanism controls will be required. The additional controls will require additional stored programs for operation thereof.

There are many known methods for accurately determining the present location of a craft in the water. One of the modern approaches to position determination, and the one preferably used in the navigation system herein disclosed, is the utilization of earth orbiting satellites. An appropriate satellite system for this application is the Navy Navigation Satellite System, also known as TRANSIT, which is described by T. A. Stansell, Jr. in the Proceedings of the National Marine Navigation Meeting, Oct. 11–12, 1967, at pages 36–60, published by the Institute of Navigation in Washington, D.C., U.S.A.

Other radio navigation systems, such as hyperbolic systems like OMEGA or LORAN may be substitued for the Transit system. Alternatively, point location stations, such as sonar transmitters disposed at predetermined points on the ocean bottom, may be employed for providing the desired location information.

If four satellites are in appropriate polar orbits, one of them comes into the view of any location on the surface of the earth every one or two hours. During one satellite pass, it is possible to obtain a navigation fix at a terrestial location with a very small error.

Figure 1:
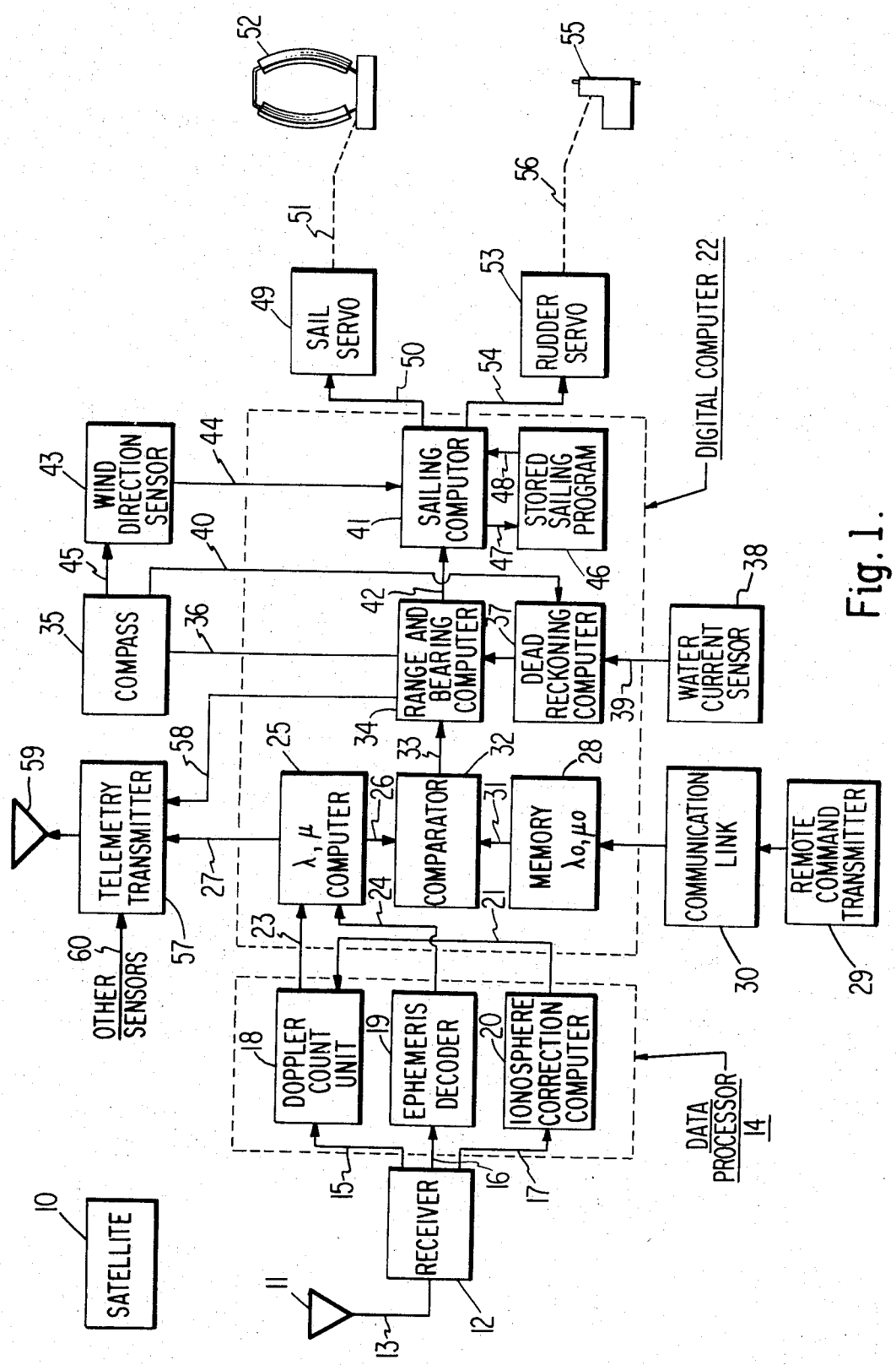
FIG. 1 is a block diagram of an automatic navigation system according to one embodiment of the invention.

In FIG. 1, a satellite 10 passes within the radio line of sight of the present location of the sailing vessel and transmits appropriate navigation and timing information. Antenna 11 located on the craft receives the transmitted signals and provides the information to receiver 12 via line 13. Receiver 12 provides the incoming signals to data processer 14 via lines 15, 16 and 17.

Line 15 is connected to the input terminal of Doppler count unit 18. Doppler count unit 18 determines the total number of cycles of the heterodyned Doppler signal during a selected time interval.

Line 16 is connected to the input terminal of an ephemeris decoder 19 which translates the digital code representing the up-to-date geometric elements of the satellite orbit into computer language.

Line 17 is connected to the input terminal of an ionosphere correction computer 20. Ionosphere correction computer 20 provides a correction to the Doppler count via line 21. The correction for ionospheric conditions is based upon the comparision of signals at two received frequencies. Output signals from the data processor 14 are provided at the input terminals to a general purpose digital computer 22 via lines 23 and 24.

Lines 23 and 24 carry navigation fix information to a section of the general purpose digital computer 22 termed the latitude-longitude ($\lambda,\mu$) computer 25. Latitude-longitude computer 25 determines the present position of the vessel and encodes the resulting coordinates and provides corresponding signals on lines 26 and 27.

The latitude and longitude coordinates of the desired location ($\lambda_0, \mu_0$) are stored in the computer memory 28. Access to the computer memory 28 may be had locally or via a remote command transmitter 29 linked to the memory by way of the communications link 30. Link 30 may comprise a radio receiver cooperating with transmitter 29. The stored coordinates of the desired location are represented by a signal coupled from the memory via line 31.

The signals representing the present location of the vessel on line 26 and the signals representing the desired destination location on line 31 are compared in the comparator 32. Comparator 32 provides signals corresponding to the difference between the coordinates of the present location and the coordinates of the desired location on line 33.

The signals on line 33 are provided to a range and bearing computer 34. Range and bearing computer 34 performs a trigonometric transformation to give the range and bearing from the present position to the desired position. In suitable linear units, the range R is given by $$R = \sqrt{(\Delta\lambda)^2 + (\Delta\mu)^2}$$

where $$\Delta\lambda = \lambda - \lambda_0$$
$$\Delta\mu = \mu - \mu_0.$$

The bearing (relative to true north) is given by A, where $$A = \tan^{-1} \Delta\lambda/\Delta\mu .$$

The reference direction for the range and bearing computer 34 is provided by the magnetic compass 35. The corresponding signal is provided to the range and bearing computer 34 from the compass 35 via line 36.

When the navigation data source is intermittent, as is the case where an orbiting satellite is the data source, means must be provided to generate the range and bearing continuously between the times of fixes. This function is performed by dead reckoning computer 37, which continuously computes the range and bearing to the destination.

The dead reckoning computer 37 obtains information as to the speed of the craft through the water by the commonly used technique of a taffrail log water current sensor 38. Sensor 38 comprises a propellor and electrical generator whose speed varies linearly with $v$, the speed of the craft through the water and which measures by counting total revolutions, the distance d traveled through the water during a time interval $t_2 - t_1$. The corresponding signal from sensor 38 is coupled to the dead reckoning computer 37 via line 39. Water current sensor 38 also includes a vane for sensing the direction of movement of the water with respect to the fore-aft axis of the craft.

Computer 37 together with sensor 38 performs the integration $$d = \int_{t_1}^{t_2} v dt$$

and also resolves $d$ into north and east components of distance travelled with respect to the water:

$$d_n = d \cos A$$
$$d_e = d \sin A$$

where A is the bearing of the fore-aft axis of the vessel with respect to north. The computer 37 obtains a north reference signal from compass 35 via line 40 with suitable correction for magnetic variation. Using components $d_n$ and $d_e$, determined at any time $t_2$, the approximate position of the craft between navigation fixes is computed.

The continuously generated signals corresponding to the range and bearing to the destination are coupled to the sailing computer 41 via line 42. In addition, a signal corresponding to the wind direction, generated in the wind direction sensor 43, is provided at an input terminal of the sailing computer 41 via line 44. Wind direction sensor 43 is provided with a reference direction signal from compass 35 via line 45.

Depending upon the prevailing wind conditions and the bearing to the new location, appropriate sailing maneuvers for the most efficient sailing of the vessel are called up from the stored sailing program 46. The stored sailing program is entered via line 47 and the appropriate signals corresponding to the desired maneuvers are coupled to the sailing computer 41 via line 48.

The stored sailing program 46 is a look-up table wherein the appropriate positions of the sail and the rudder with respect to an arbitrarily determined fore-aft axis of the craft are contained. The look-up table is empirically determined for the particular craft.

The appropriate positions of the sail and rudder for the most efficient sailing of the craft are initially experimentally determined and entered in the look-up table.

Specifically, the preferred craft previously mentioned has, by virtue of its construction, the ability to traverse the distance between the present location of the craft and another location by a single setting of the sail and a single setting of the rudder in predetermined positons with respect to the arbitrary fore-aft axis through the substantially circular hull. This particular craft can head into the wind without being stalled even though no headway can be made in a sector defined by the close-haul angle of the craft and centered about the direction of the wind. The sail on the preferred circular hull craft can be turned clockwise or counter-clockwise with respect to the wind direction without detrimental effects. Furthermore, the sequence of setting the sail and the rudder and the rate of movement of both has been found to be immaterial for this particular craft.

Therefore, for each angle, B, the sailing program 46 provides signals to the sailing computer 41 corresponding to an experimentally determined sail position and rudder position.

Sailing computer 41 provides corresponding signals to the sail servo system 49 via line 50. Sail servo 49 controls the orientation of the sail 52 via the mechanical link 51. Simultaneously, the sailing computer 41 provides corresponding signals to the rudder servo system 53 via line 54. Rudder servo 53 orients the rudder servo system 53 via line 54. Rudder servo 53 orients the rudder 55 via the mechanical link 56.

All of the functions described by the blocks contained within the digital computer 22 are internally performed in computer 22. There are many general purpose digital computers readily available for performing the functions of digital computer 22. One such computer is the PDP-8 computer built by the Digital Equipment Corporation, of Maynard, Massachusetts. The programming of such a digital computer to perform the steps previously described is well known in the programming art.

Sailing craft are characterized, as a result of their individual structure, by what is termed as a close-haul angle. The close haul angle of a sailing vessel is defined as the closest angle to the direction from which the wind blows which will allow the vessel to gain distance toward the windward direction. A sailing vessel is unable to sail directly into the wind, and the close-haul angle of plus or minus M with respect to the direction from which the wind blows (the plus and minus values may differ if the vessel is asymmetrical about its fore-aft axis) defines a sector within which the vessel may not sail directly to any point contained within the sector.

When a sailing craft does in fact head into the sector defined by the angles plus and minus M at low speed the craft will come to a stop, heading into the wind, and is said to be stalled or "in irons." When a craft is "in irons" it cannot turn port or starboard but will drift slowly downwind. The vessel will be able to get out of "irons" only with difficulty and with the application of some external force or change in the prevailing wind conditions.

When it is desired to sail a craft to a location within the sector defined by the close-haul angle the craft must tack in order to reach that location. One or more tacks may be necessary depending upon the range and prevailing wind conditions.

Figure 2:
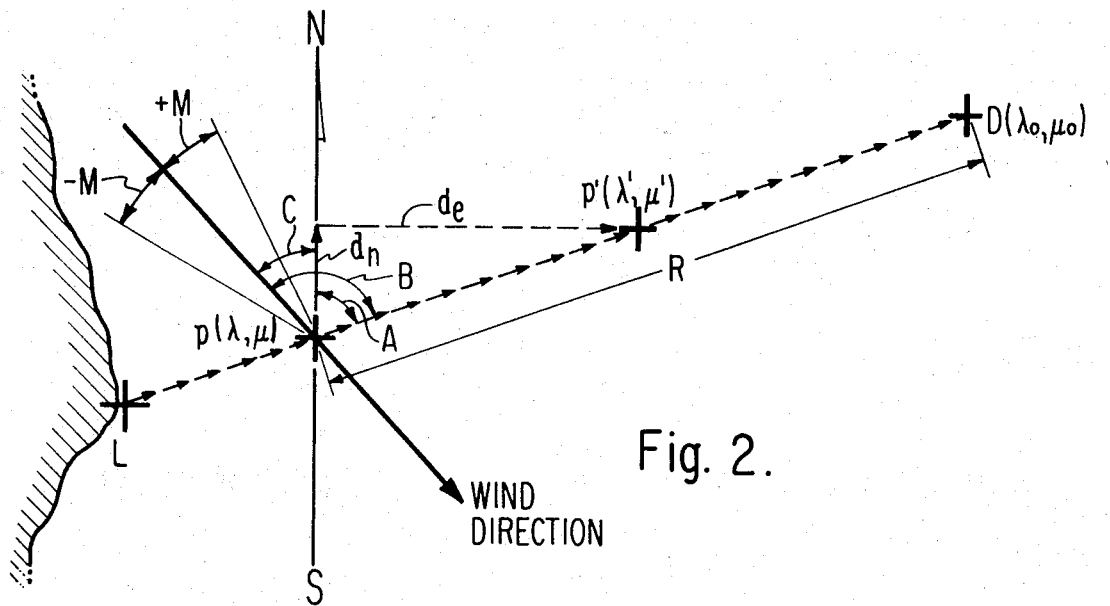
FIG. 2 is a chart illustrating the conditions under which a vessel may be sailed from its present location directly to its destination location.

Referring now to FIG. 2, together with FIG. 1, the vessel is launched from a land base at point L. At some time thereafter, satellite 10 appears above the horizon at the location of the vessel and the onboard equipment computes the present coordinates $(\lambda, \mu)$ of the point P. The destination coordinates $(\lambda_0, \mu_0)$ of the point D are stored in the memory 28. The wind direction is at the angle C with respect to north. Sailing computer 41 determines that the bearing B (with respect to the wind direction) to the destination is greater than the close-haul angle M. Stored sailing program 46 calls up the appropriate sailing maneuvers, that is, the sail position and the rudder position to sail directly from point P to point D at a bearing of A with respect to north and a range R. With the sail 52 and the rudder 55 positioned in accordance with the commands from the sailing computer 41, the vessel starts to sail a course directly to point D.

As the vessel sails the dead reckoning computer 37 continuously computes the approximate location of the vessel by resolving the components $d_n$ and $d_e$ shown in FIG. 2.

Returning to FIG. 1, a telemetry transmitter 57 is provided to transmit the continuously generated signals corresponding to range and bearing from computer 34 on line 58.

A suitable antenna 59 is coupled to the telemetry transmitter 57 for this purpose. The signals on line 27 corresponding to the accurately determined present position are also provided at transmitter 57 in order to relay this information to a remote monitoring station. In addition, signals corresponding to the parameters determined by other sensors such as sensors 43 and 38 are provided at transmitter 57 via line 60 for relay to the monitoring station.

Figure 3:
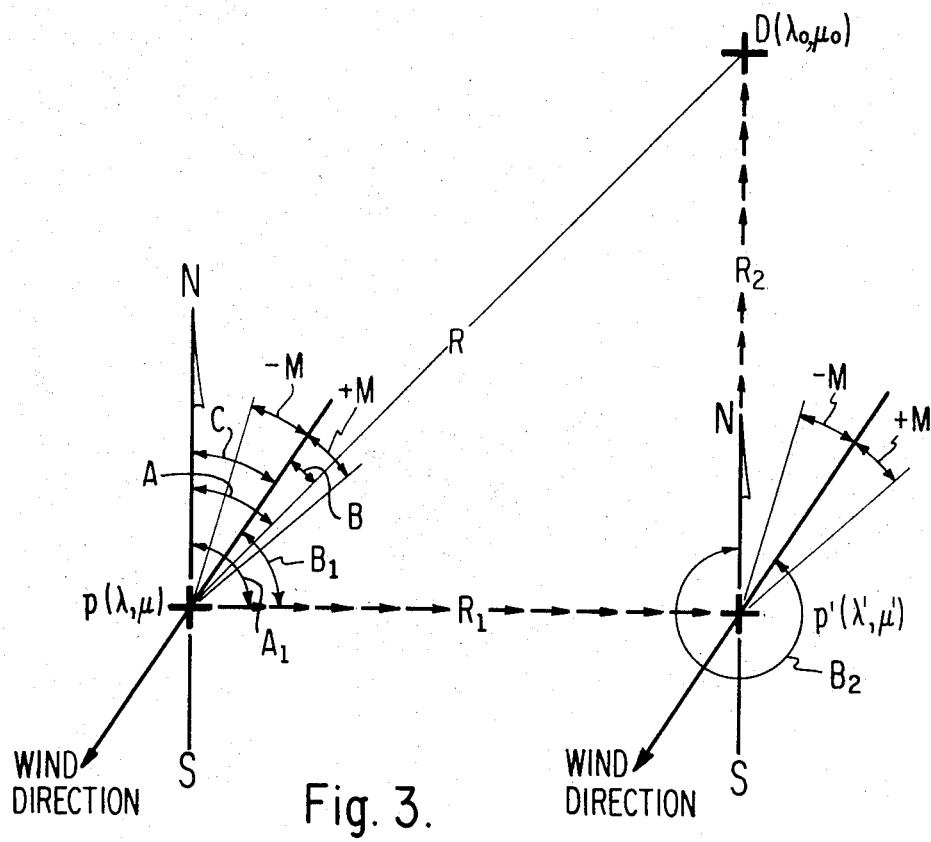
FIG. 3 is a chart illustrating the conditions under which the vessel must tack in order to sail from its present location to its destination location.

Referring now to FIG. 3, together with FIG. 1, satellite 10 passes within the radio line of sight of the vessel and the present coordinates $(\lambda, \mu)$ of the point P are determined. The coordinates $(\lambda_0, \mu_0)$ of the destination D under these particular conditions lie within the sector determined by the close-haul angle of plus and minus M. The vessel therefore cannot traverse the range R on a bearing of A with respect to north under these prevailing wind conditions. Therefore, the stored sailing program 46 will provide the necessary sail and rudder position information to enable the vessel to tack to the destination location D.

The sailing computer 41 determines the existence of the conditions requiring tacking by comparing the original bearing A with respect to north, provided by the range and bearing computer 41, with the present wind direction provided by sensor 43. When tacking is required, sailing computer 41 computes an offset to the original bearing A to determine a new bearing $A_1$. Sailing computer 41 also computes a new range $R_1$ which is arbitrarily programmed to be approximately 0.7 of the original range R in the case where it has been decided to sail to the destination D in two tacks.

The new bearing $A_1$ is translated into bearing $B_1$ with respect to the wind in computer 41. Bearing $B_1$ and range $R_1$ are provided to the stored sailing program 46 via line 47 and the sail 52 and rudder 55 are positioned according to the look-up table.

The vessel will sail on the first tack until the distance $R_1$ has been traversed or until the satellite 10 passes over, whichever comes first.

If the satellite 10 passes over before the first tack is completed a new range and bearing will be set for point D based on the updated information.

If the distance $R_1$ is traversed before the satellite 10 passes over the system will compute the new bearing $B_2$ and range $R_2$ when the vessel arrives at point P'. The vessel arrives at point P' when the continuously generated range information from the dead reckoning computer 37 matches the computed range $R_1$ in the sailing computer 41.

At point P', the system determined the range $R_2$ and bearing $B_2$ with respect to the wind and if the bearing $B_2$ is now beyond the close haul sector the craft will sail directly to the destination point D. If the craft is within the close haul sector at point P' the system will again initiate the procedures to sail from point P' to point D on two tacks. Changing wind conditions may cause the bearing $B_2$ at point D to fall within the close haul sector.

Once having arrived at the destination point D, it is desired to maintain or station-keep the vessel in the immediate vicinity of point D in order to perform its meteorological and hydrological functions.

Figure 4:
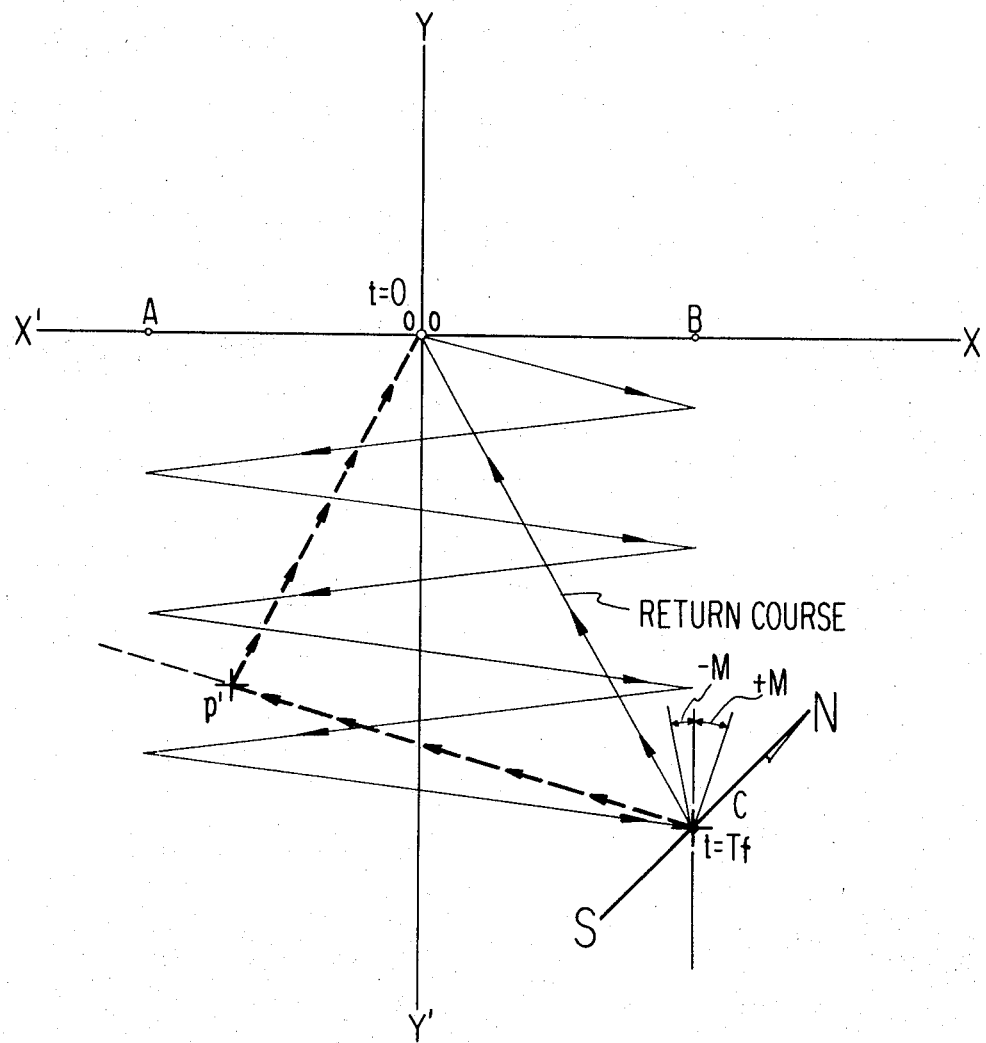
FIG. 4 is a chart showing the manner in which the vessel station-keeps at the destination location.

Referring to FIG. 4, a preferred method of station-keeping is shown. Assume the craft is at station 0 at time $t=0$, the time of the initial navigation fix. In an $x$, $y$ coordinate system the selected station is at $x=0$, $y=0$. The wind vector is along the y-axis and is directed toward the negative direction. Navigation fixes are made at equal time intervals $\Delta t_f$, starting at $t=0$.

Starting at station 0, having $x$, $y$ coordinates 0,0 the vessel is sailed at 90° with respect to the wind vector for a time $\Delta t/2$. Course reversals at times of $T=\Delta t, 2\Delta t, \ldots$, are made until the next satellite passes over and a navigation fix is obtained at $t=t_f$.

If ocean currents are not appreciable the craft will sail back and forth between the points A and B in FIG. 4.

At the time of the navigation fix, $t=t_f$, a retrace course back to the station at 0, 0 is determined by the system. FIG. 4 illustrates the retrace courses when currents or other perturbing forces cause the vessel to drift. If the bearing from the craft location, at time $t_f$, to the point 0,0 lies outside of the close-haul angle sector, then the craft will return on a direct path to its desired station. However, if the bearing of the return course lies within the close-haul sector then the craft will tack to its desired station as shown in FIG. 4. Point P' in FIG. 4 is determined by the continuously generated information from the dead reckoning computer 37. In this manner, the sailing craft will be kept within a few tenths of a nautical mile from the desired station despite any drift caused by water currents.

Point C in FIG. 4 is also determined approximately by the dead reckoning computer 37. However the position so determined will differ from the more precise fix from the radio navigation system. The difference in position or "closing error" provides a measure of the magnitude and direction of the prevailing ocean surface current. The system of the present invention thus serves as a sensor of ocean current.

With the wind and ocean currents in a more favorable orientation with respect to the vessel, the craft will sail between points A and B in FIG. 4 and remain extremely close to the desired station at 0,0.

What is claimed is:

1. A method of automatically navigating a sailing vessel without the requirement of human intervention to a given destination, said vessel having a hull, a sail and a rudder, the structure of said vessel determining a close haul angle of plus or minus M with respect to the wind direction, which comprises:

automatically determining the present location of said vessel from electrical navigation signals provided from a source remotely located with respect to said sailing vessel;

automatically determining the range and bearing from said present location to said destination;

automatically determining the wind direction and the angle, B, of the bearing from said present location to said destination with respect to said wind direction;

automatically positioning said sail and said rudder, in accordance with the predetermined positions for said sail and said rudder stored in a memory means, to sail said vessel directly to said destination from said present location when the absolute value of said angle B is greater than the absolute value of said angle M; and automatically positioning said sail and said rudder, in accordance with other predetermined positions for said sail and said rudder stored in said memory means, to sail said vessel on two or more tacks to said destination from said present location when the absolute value of said angle B is less than the absolute value of said angle M.

* * * * *